June 3, 1930.  A. PRICE  1,761,536
STRIP FORMING AND ASSEMBLING MACHINE
Filed Dec. 11, 1924  4 Sheets-Sheet 1

June 3, 1930.                    A. PRICE                    1,761,536
               STRIP FORMING AND ASSEMBLING MACHINE
                  Filed Dec. 11, 1924          4 Sheets-Sheet 3

INVENTOR
Arthur Price
BY
Mayer Warfield & Watson
ATTORNEY

Patented June 3, 1930

1,761,536

UNITED STATES PATENT OFFICE

ARTHUR PRICE, OF FREEPORT, NEW YORK

STRIP FORMING AND ASSEMBLING MACHINE

Application filed December 11, 1924. Serial No. 755,170.

This invention relates to a machine for operating upon strips of material, as, for example, metal and photographic films.

It is an object of the present invention to provide a practicable method, as well as apparatus, by means of which material strips may be united in a commercially acceptable manner.

It is a further object to provide a device of the character stated in which the strips are not alone united, but are also subjected to manipulations, by means of which they are shaped or formed to be capable of being efficaciously joined.

A still further object is to be found in that the present invention, although useful in producing different articles involving multiple or composite strip bodies, is particularly designed for use in operating upon and joining films with carrying-bands or strips.

Another object is to be predicated on the construction of a machine, by means of which a single carrying-band may be provided to support or carry the entire film body.

Still another object is that of furnishing a machine which, in addition to properly uniting a plurality of strips of material, and particularly a film and band, will also provide an article which is commercially desirable and useful in that the same will withstand a great amount of wear without injury and thus be capable of being used in associations heretofore regarded as impracticable.

An additional object is that of providing a machine which will efficiently perform the purposes for which it is intended, and which will also be economically and readily manufactured and assembled.

Other objects of the invention will in part be obvious and will in part appear hereinafter.

The invention accordingly comprises the features of construction, combinations of elements, and arrangements of parts, which will be exemplified in the construction hereinafter set forth, and the scope of the application of which will be indicated in the claims.

For a fuller understanding of the nature and objects of the invention reference should be had to the following detailed description taken in connection with the accompanying drawings, in which.

In the present embodiment of the invention a machine has been illustrated which may be used in applying a film strip to a carrying-band, to—in other words—produce an article such as has been illustrated, for example, in my co-pending application Serial No. 585,415, filed August 31, 1922, on film-carrying strip, which application matured into Patent No. 1,688,653, granted October 23, 1928.

Thus, in the drawings which form a part of this invention, the reference numeral 25 indicates supporting members, preferably mounted upon a suitable platform 26, and in turn, mounting a plate providing a deck 27, which furnishes that portion of the machine which will be hereinafter termed the bed.

In the present embodiment the platform 26 also carries three standards 28, at the upper end of which reels 29, 30 and 31 are mounted, the reel 29 carrying a coil of material such as strip brass 32, while the reel 30 carries a film strip 33, the machine serving to join these strips together in a manner hereinafter brought out, and when thus united, disposing the same in the form of a coil upon the reel 31 so that it might be said that the reels 29 and 30 are supply or delivery reels, while 31 provides a receiving or storage reel.

Primarily considering the manipulations to which, in the present instance, the strip 32 is subjected, it will be perceived that the body of the latter is brought to extend in a plane adjacent to, and in substantial parallelism with, the upper surface of the deck 27 by preferably passing it around an idle roller 34 located adjacent the forward end of this bed. To the rear of the roller 34 the plate providing the deck 27 carries the machine-head 35, which supports a fly-wheel 36 upon a drive-shaft 37. Positioned adjacent the head 35 and carried thereby is a ram 38, which is adapted to be reciprocated in any suitable manner, such as, for example, by providing an oblong opening 39 in its body and passing through this opening a pin 40, which has its shank firmly secured to, and eccentrically disposed relatively to, the shaft 37.

Figures 5, 6:
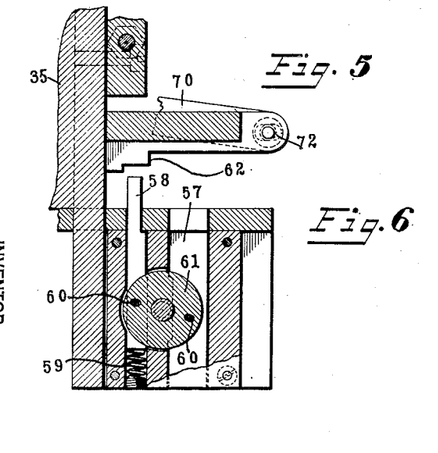
Fig. 5 is a sectional plan view of the device as shown in Fig. 3.
Fig. 6 is a transverse sectional view taken along the lines 6—6 and in the direction of the arrows indicated in Fig. 5.

The machine as at present illustrated is adapted to have the ram 38 merely reciprocate in a straight path, and with this in mind the edges of this element may be dove-tailed, as has been best shown in Fig. 5, and the head 35 is formed with a correspondingly dove-tailed slot of a size sufficient to accommodate the shank of the ram, this dove-tailed construction of the elements having been indicated at 41 in the figure referred to. It is obvious that the pin 40 may carry a sleeve 42, which encircles its body and is disposed to bear against the upper and lower surfaces of the opening 39 so as to reduce friction. As a consequence, it will be understood that when the shaft 37 is revolved the pin 40 and the sleeve carried thereby will move in a circular path. This movement will be translated into pure reciprocatory motion on the part of the ram 38 incident to the fact that the movements of the latter are confined, as has been previously brought out, and the opening 39 is of sufficient length to permit the pin and sleeve aforementioned to move longitudinally of the machine, without corresponding movement on the part of the ram.

Figure 1:
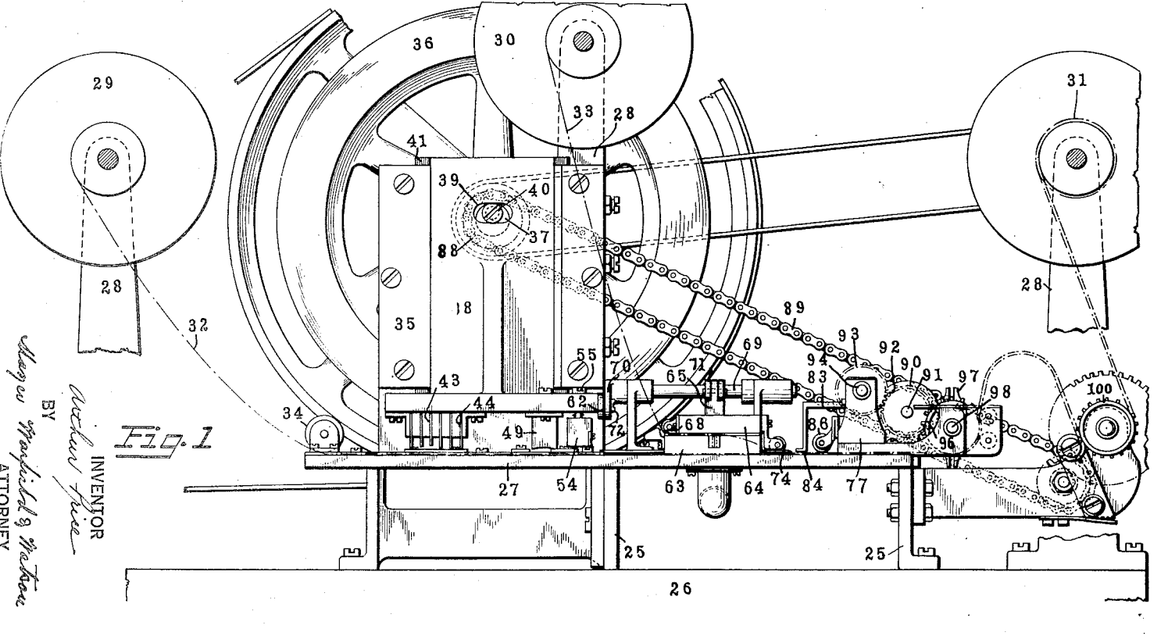
Fig. 1 is a fragmentary side elevation of a machine such as may be utilized for uniting a film strip and carrying-band therefor, said machine embracing one form of the present invention.
Figures 3, 4:
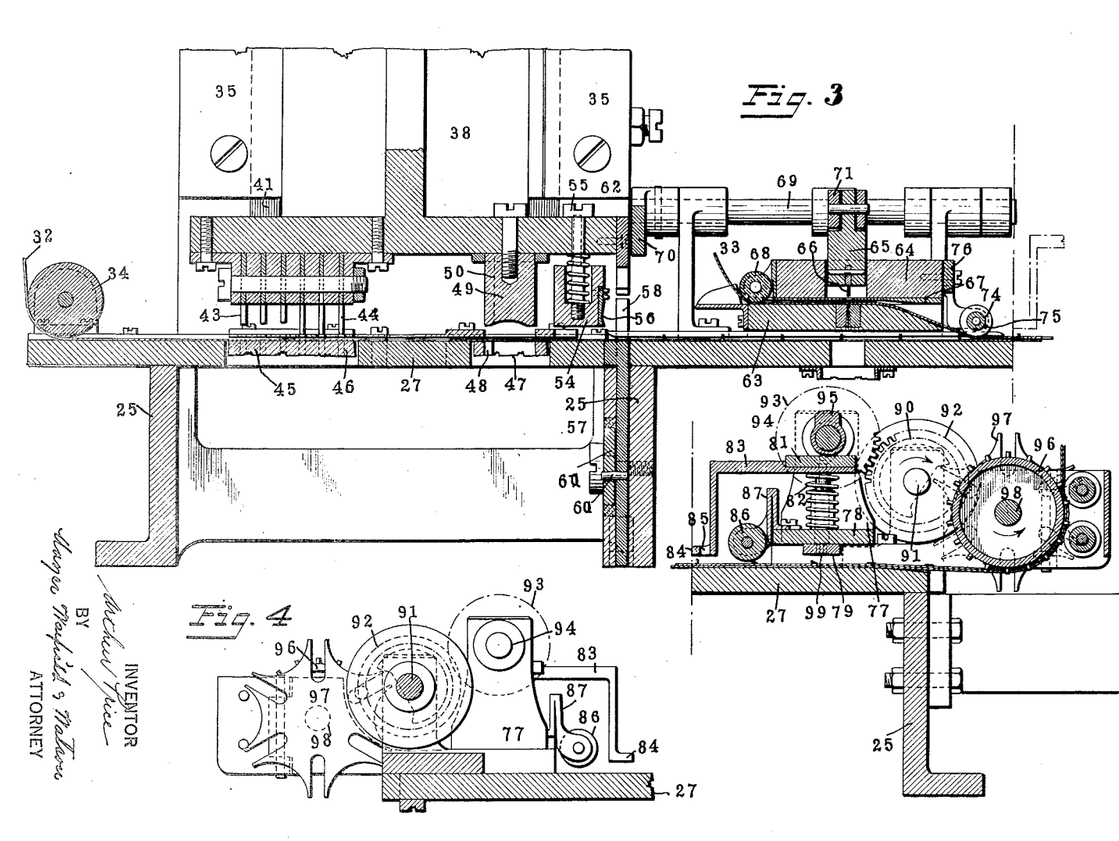
Fig. 3 is a sectional side view taken through the entire machine, this view being shown in two sections.
Fig. 4 is an elevation showing the opposite side of the machine, and particularly illustrating the parts shown in the second section of the preceding figure.
Figure 7:
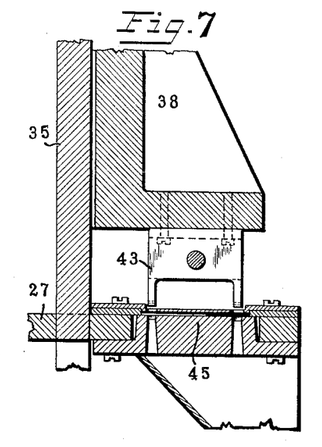
Figs. 7, 8, 9, 10 and 11 are similar views showing the mechanism at different portions or stations within the machine.
Figure 8:
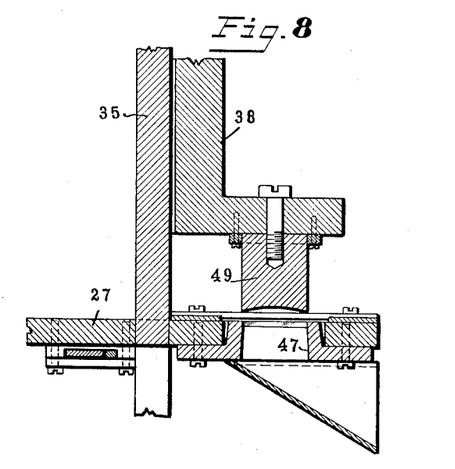
Figure 9:
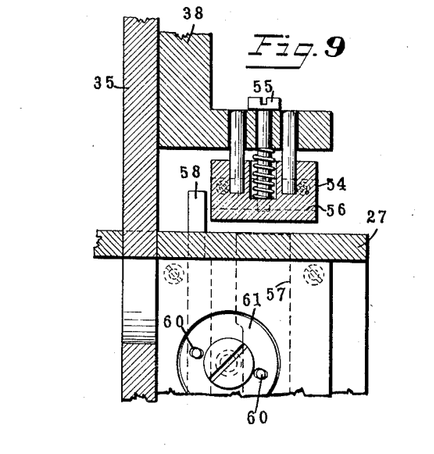

As has probably best been shown in Figs. 1, 3 and 7, the ram 38 has affixed to its under surface a punch embracing two series of plungers 43, each of which, in the present instance, includes three successively shorter pins. To the rear of these plungers a pilot is provided, which may likewise include two series of pins 44, and disposed below the plungers 43 is a die 45 adapted to cooperate with the same, and this die may be continued and formed with guide openings 46 for the accommodation of the pins 44 providing the pilot.

To the rear of this element an aperture-forming means is provided, and this mechanism, in the present instance, includes a die 47 supported upon the bed of the machine and having a central aperture, as well as tongues or ribs 48 which extend into this aperture. Carried by the ram 38 at a point directly above this die is a punch or die adapted to cooperate with the same, this element being identified by the reference numeral 49, and being of a sufficiently small size to enter the aperture aforementioned, and being formed with grooves 50 for the accommodation of the ribs 48.

Figure 2:
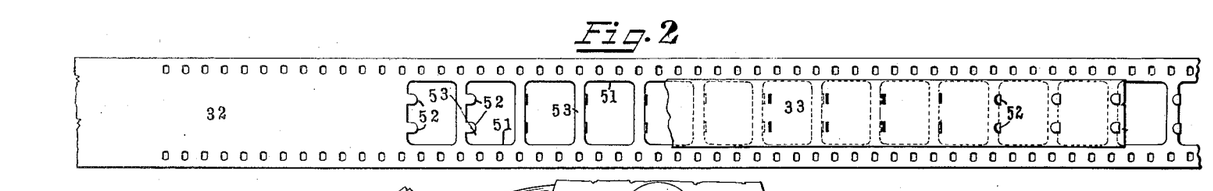
Fig. 2 is a face view of the strips illustrating their bodies from the time they enter the machine until the time they are united and discharged therefrom.

Thus, upon the strip being brought to this station, and the ram descending to project the die 49 into the aperture of the counter-die 47, the strip 32, as in Fig. 2, will be formed with an opening or window 51, within which tongues 52 project, and it will be apparent that a repeated operation of the parts will serve to provide a series of equally-shaped and spaced windows, each separated by a cross-bar 53, of which the tongues 52 will form an integral part.

According to the present embodiment of the invention, and as in Figs. 3 to 9, a presser-foot is provided at a point succeeding the station at which the window-forming operation occurs. This presser-foot may include a head 54, which is mounted upon a spring-pressed pin 55 secured to and extending below the under face of the ram 38. A bearing-plate 56 is attached to the rear face of the head 54, and, as has been indicated, the outer face of this plate may be formed with a depression, for a purpose hereinafter brought out. At a point immediately to the rear of the head aforementioned there is provided a slide 57, which has its body disposed to normally occupy a position below the upper surface of the bed of the machine, but is capable of being moved or projected to extend in a position above this surface, it being here noted that the size of the upper end of this slide is such that it may readily pass through one of the windows formed in the strip 32.

With a view to effecting the projection of the slide, although normally maintaining the same in retracted position, an operating bar 58 may be utilized, which is mounted for movement adjacent to the slide 57 and is pressed by means of a spring 59, so that it normally assumes a position at which its end extends above the upper surface of the machine-bed, as has been shown, for example, in Fig. 6. Both the slide and bar carry pins 60, and rotatably mounted to one side of the first-named element is a disk 61, which is formed with oblong openings, each being adapted to receive one of these pins. Thus it is obvious that when the bar is retracted the slide will be projected, but normally, due to the provision of the spring, the parts will assume the reverse of this position. In order to effect a retraction of the bar the ram 38 may have an extended portion 62, the under surface of which will contact with the upper surface of the bar when the ram is moved downwardly, so that it will be understood that as this movement on the part of the ram occurs the presser-foot provided by the spring-pressed head 54 will be moved to yieldingly engage the upper surface of that portion of the strip 32 which underlies the same, it being appreciated that this engagement, however, will be adequate to prevent any accidental displacement of said strip. Also, as the ram descends the bar 58 will be projected within the machine body, resulting in a consequent projection on the part of the slide 57, and, incident to the fact that the lower edge of the bearing-plate 56 comes to lie on that portion of the strip at which one of the cross-bars 53 exists, and further due to the fact that the slide 57 moves in a plane immediately adjacent the outer edge of the said bearing-plate, the tongues or teeth 52 of the strip will be bent to extend upwardly at substantially right-angles to the strip body.

It is to be noted in this connection that, due to the depression in the outer face of the bearing-plate 56, the tongues 52 are permitted not alone to be pressed to extend into a plane at right-angles to the strip body, but adequate clearance is provided to allow these parts to actually move into a plane beyond this line. This is desirable, due to the inherent resiliency of the material from which the strips are formed and the consequent normal tendency of the tongues to spring back to their original position, in that this construction will to the greatest extent overcome this difficulty, and the tongues will remain in as nearly a position at right-angles to the strip body as is possible.

Figure 10:
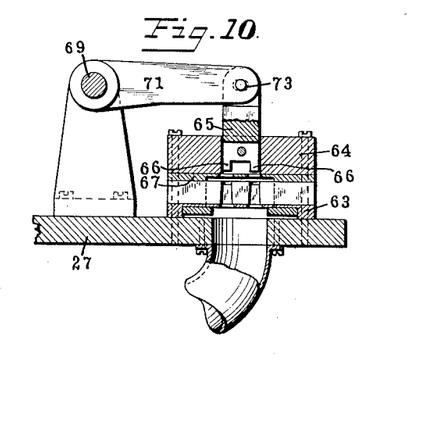
Figure 11:
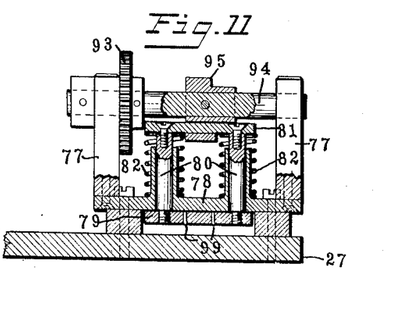

Temporarily disregarding the further movements and manipulations which the strip 32 undergoes, it will be perceived—reference being had to Fig. 1—that the strip 33, which in the present embodiment is coiled upon the reel 30, moves downwardly from this reel to a film-punching station, and—reference being had to Figs. 3 and 10—it will be noted that the mechanism at this station preferably includes a bed 63 and a head 64, which latter is spaced from the former and is provided with an opening through which a block 65 is slidable, this element carrying in the present instance a pair of punching or cutting teeth 66. These members are arranged in line with the openings formed in a guide-plate 67 carried by the head 64, as well as die-openings formed in the bed 63, and an idler roller 68 may be provided to guide the strip 33 into the space extant between the bed and head.

It will thus be apparent that upon the strip 33 moving through this space, and upon the block 65 being reciprocated to cause the teeth 66 to pass through the openings in the guide-plate 67 and bed, slits will be formed in the body of the film strip, and if the latter is moved properly, it will be appreciated that these slits, which are of a size sufficient to accommodate the teeth or tongues of the strip 32, will ordinarily be spaced at equal intervals throughout the body of the strip 33.

Now with a view of providing means serving to operate the block 65 in the manner aforedescribed, it will be seen that a shaft 69 may be employed, which shaft is mounted upon brackets and carries a crank-arm 70 adjacent its inner end, and a further crank-arm 71 which may be in line with the block 65. The arm 70 is in the present instance connected with the ram 38 by means of a pin-and-slot connection 72 between the arm and the end of the extended portion 62 which is affixed to the ram. Thus, upon the ram being reciprocated in a manner already brought out the arm 70 will be oscillated and a corresponding movement will be translated to the shaft 69, which will result in the block 65 being reciprocated owing to the provision of a second pin-and-slot-connection 73 in between the arm 71 and the upper end of the block.

Immediately beyond the bed 63 there is a station at which mechanism is provided which serves to bring the strips 32 and 33 into juxtaposition. Briefly described at this time, it will be noted that this mechanism—reference being particularly invited to Fig. 3—includes a roller having a body 74 formed with grooves 75, this roller being adjustably mounted in any suitable manner, as, for example, by having the ends of the same supported by a bracket 76 movably attached to the head 64.

It will thus be understood, assuming the strips 32 and 33 to be moved in substantial synchronism, that the last-named strip will be moved over the inclined lower surface of the bed 63 and towards the strip 32, and that the roller 74 will serve to bring said strip 33 to a position adjacent the upper face of the strip 32, and in bringing these strips into juxtaposition will guide the same in such a manner that the tongues 52 of one strip will enter the openings of the other.

The further functions produced at this station will be later brought out, in that certain of the construction hereinafter described is, according to the present exemplification of the invention, utilized to produce the additional results predicated on the mechanism at this point.

In the illustrated embodiment of the invention the functions derived by the use of the mechanism at the next station might be subdivided into groups A, B and C, and although the mechanism is somewhat interrelated, this mechanism might also be said to fall into the groups aforedesignated.

Thus, as will be seen—reference being had to Figs. 1, 3, 4 and 11—standards 77 are secured to the bed 27, one adjacent each side of the strip channel and at points to the rear of the station at which the two strips are first brought into juxtaposition. A plate 78 is is supported between the standards 77 and in spaced relation to the deck 27. A head 79 is slidably carried by and below the plate 78 in any suitable manner, as, for example, by the use of pins 80, which slidably extend within and beyond the sleeves forming a part of the said plate. The upper ends of these pins may be connected together by a yoke 81, and in order to normally maintain the plate 78 in its uppermost position compression-springs 82 may be interposed between the upper face of the plate and the under face of the yoke. This mechanism falls into group C, and the purpose of the same will be hereinafter brought out.

Preferably carried by the yoke 81 is an arm 83, and secured to the outer end of this arm is a presser-foot including a body 84 formed—as has been particularly brought out in Fig. 5—with openings 85, which are of ample size to accommodate the tongues extending upwardly from the strip 32 and through the openings of the strip 33, and it is hereto be noted that this presser-foot is arranged well in advance of the head 79, and due to its mounting will move in synchronism with the head towards the bed 27 of the machine. The presser-foot is the primary factor in the A group of mechanism.

Group B includes in the present embodiment a roller 86, which preferably extends into a plane below that normally occupied by the presser-foot 84 and head 79, and this roller, by means of a somewhat resilient mounting 87, is attached to the plate 78 and extends into a position substantially intermediate the presser-foot and head.

With a view to operating the mechanism provided at stations A and C, it will be noted—reference being had to Fig. 1—that the shaft 37 may carry a sprocket-wheel 88, around which passes a chain 89, said chain also passing around a sprocket-gear 90 mounted upon a shaft 91, which is positioned adjacent the end of the deck 27. This shaft, among other elements, carries a gear 92, which meshes with a gear 93 in turn carried by a shaft 94 supported between the standards 77. Thus, upon the driving-shaft 37 being rotated, it will be obvious that the shaft 94 will also be rotated, and, that a cam 95 which is carried by this latter shaft at a point above the yoke 81 will cause a reciprocating movement to be imparted to the head 79 in opposition to the springs 82 which press the said yoke upwardly into contact with the operating surface of the said cam. It will furthermore be obvious that as the yoke, and consequently the head, are reciprocated, a corresponding movement will be imparted to the presser-foot, which as a result will move in synchronism with the parts aforementioned.

To the rear of all of this mechanism there is preferably provided a sprocket 96, which may be intermittently driven in any desirable manner, as, for example, by the use of a conventional "Geneva" movement 97, the parts of which are disposed respectively upon the shafts 91 and 98, which latter supports the sprocket 96.

In certain instances, particularly if a film stock which has not been pre-shrunk is utilized, it is desirable to allow for subsequent shrinkage which may come into being. Also, it may be desired to allow for other factors not necessarily involved in the question of uniting a film with a metal carrying-band.

By means of the invention herewith embodied, the desired result may obtained, i. e., that of providing a surplusage of one strip body with respect to the length of the other. In the present instance this is accomplished, and the amount of the surplusage may be accurately gauged and regulated by the adjustability of the roller 74 towards and away from the deck of the machine. It must be borne in mind in accomplishing this result that the following essential factors govern certain phases of the operations to which the strips are subjected. In the first place, in numerous associations it may be desirable to provide an excess in length on the part of one strip element with respect to the length of the other over the area of the association of the two. Thus it follows that the distance between the pairs of tongue apertures formed in the strip 33 must necessarily be a greater distance apart than the distance which exists between the pairs of tongues of the strip 32.

Secondly, both strips, in so far as the present result is kept in mind, are drawn or pulled along the deck of the machine by means of the sprocket 96 engaging the body of the strip 32 so that, as far as this feeding is concerned, the movements of both strips will be equal.

Further, it will be understood that when the roller 74 is in its most elevated position a certain fixed distance will exist between those openings of the strip 33 through which a pair of tongues 52 of the strip 32 are being introduced and the openings which are being formed by the teeth 66. We will assume that this distance corresponds to the distance between the already named pair of teeth 52 and that pair of the same which is to be introduced through the openings being formed in the strip 33 by means of the teeth carried by the head 65. If now before these latter openings are formed the roller 74 is adjusted to occupy its most depressed position the path of travel of the strip 33 will obviously be lengthened in exact ratio to the amount of this adjustment, and as a consequence, the openings to be formed by means of the teeth 66 will be a greater distance away from the openings through which the teeth 52 are being introduced than would have been the case if the roller 74 had remained in its initial position. When now the metal strip is drawn forward by means of the sprocket 96, carrying the film with it, the two strips will move as one, but due to the fact that that portion of the strip 33 immediately in advance of the formed openings is arranged in an arc, incident to this passing over the curved under surface of the roller 74, it will be obvious that vertical lines coextensive with adjacent pairs of teeth 52 will substantially intersect the adjacent pairs of openings in the strip 33, although, as a mater of fact, the distance in a straight line between these openings is in excess of the distance between adjacent pairs of teeth. As a consequence, upon the continued movement of the strips, the teeth will enter the openings into which they are to be introduced, it being of course understood that the openings are of a size slightly greater than the size of the teeth to be inserted into them, so that a certain amount of latitude is allowed in this connection. As the strips continue to move, and the previously referred to portion of the strip 33 is advanced to a point beyond the roller 74, the parts of its body between the tooth openings aforementioned and the preceding pair of tooth openings will fall into suitable lines between the pairs of teeth of the strip 32 with which it is associated.

It is thus obvious that the feed or movement given to the strip 33 in excess of the movement imparted to the same by means of the transportation afforded by the metal strip acted upon by the sprocket 96 is caused by the engagement of one pair of tongues 52 with a corresponding pair of openings in the strip 33 and the subsequent downward thrust of the strip 33 towards the strip 32, thus causings the openings in the body of the strip 33 to be wedged or thrust to a greater or less extent, according to the adjustment of the roller 74 upon tongues of the strip 32.

Again considering this phase of operation, it will be appreciated that both strips are moved in synchronism by means of the intermittent sprocket located at the end of the deck 27. However, due to the fact that one strip has its body moved relatively to the other strip, incident to its being wedged upon portions of the same, a slight additional pull is exerted upon the first-named strip, and as a consequence, it has an additional movement over the second strip, and the amount of this movement will govern the amount of surplusage on the part of the first-named strip with respect to the second-named one. This regulation is achieved by means of the adjustment of the roller 74, in that the more the latter is moved towards the strip 32 the greater the amount of the so-called wedging action of the strip 33 thereupon, and the consequent greater amount of additional movement of the latter strip relative to the first-named strip; in turn, the greater the amount of this additional movement the greater the amount of spacing of the pairs of openings in the strip 33, thus producing the result desired.

In reviewing the operation as depicted by the construction utilized in the present instance it will be understood that the present invention lends itself to the association of two or more strips one to the other, and in the present instance, these strips being in the nature of a film and a carrying-band therefor, they are each subjected to operations resulting in their being put into condition in which they are ready for association with each other, as well as subjecting these strips to operations by means of which further functions may be achieved.

Specifically referring to the type of machine illustrated it will be noted, following the path of travel of one of said strips, that the same is initially punched with feed openings and it is here to be noted, incident to the construction which is preferably adopted in connection with the different lengths of the pins 43, that these openings will be punched with less danger of the strip becoming torn or distorted due to the fact that a maximum strain will not be exerted upon the same at one time.

After leaving this station and being guided by the pilot, the strip is formed with sight apertures or windows separated by cross-bars, which have in association with their bodies tongues which are brought to a position at which they cooperate with another strip which is being operated upon by the machine.

This other strip is subjected to an operation in which its body, in the present instance, will be formed with openings for the accommodation of the tongues of the first-named strip and the travel of both of these strips is now merged into a common path at the beginning of which they are united. At the point of uniting, provision is made for a surplusage or excess on the part of one strip, it being of interest to note in this connection that the mechanism might be so adjusted as to give virtually any desired result.

After being placed in primary association with each other the strips are pressed into intimate engagement by means of the presser-foot 84 provided for this purpose, it being here noted that, due to the configuration of the slots 85, this element will preferably not cause any distortion or upsetting of the tongues 52 of the strip 32, but will merely cause one strip to be firmly seated upon the other and the openings of the first strip to be pressed to a point adjacent the base of the tongues of the second element. The continued movement of the strips being operated upon will cause the same to pass below what might be termed the initial fastening means; in the present instance the roller 86 which, as has been illustrated in Fig. 3, will cause the tongues 52 to be bent rearwardly in their passage under the same to extend at an angle of approximately 45°. The continued movements of the strip will place the same under the uniting element which serves to permanently associate them. In other words, as they pass under the head 79 they will stop and the head will descend to firmly press the tongues into a plane at which they will at least extend parallel to the longitudinal axis of the strips. After passing this point the strips will pass around the sprocket 96, which for the purpose of preventing any possible distortion of the tongues may have a reduced central portion, as has been clearly shown in Fig. 5.

It is to be understood in connection with the latter element that the timing of the same is preferably such that the presser-foot 84 and the parts associated therewith descend in order to effect first, a firm seating of the strips one upon the other, and second, a permanent association of these strips. In this connection it is to be noted that the head 79 may carry indenting members or spikes 99, which upon the head descending to permanently upset the tongues 52 will also serve to impress upon the outer faces of these tongues indentations which will necessarily result in portions of the tongues biting into the film body, and the latter, in turn, biting into the crossbar of the strip directly in line with the same, so that all of these parts are locked. After this operation has occurred, the head 65 with the teeth 66 carried thereby will descend, and only after the latter is retracted will the sprocket 96 serve to again feed the strips forward a distance in the present instance equivalent to the distance between adjacent pairs of tongues 52.

Finally, it will be appreciated that, as has been most clearly illustrated in Figs. 7 to 11 inclusive, the strips are so mounted that their movements will be confined to proper paths, and in connection with these views it will finally be noted that chutes may be placed below the punching mechanisms so that the particles removed from the strips will be properly disposed of and will not clog the machine.

From the foregoing it will be appreciated that a machine is provided which serves to form two strips to incorporate desired characteristics, the machine also including mechanism which unites strips thus formed into a composite whole.

The value of a mechanism constructed within the terms of the present invention will readily be appreciated when the same is viewed in the light of the motion picture industry, and more particularly, in such applications thereof where it is desired to provide a carrying-band for a film strip, which band will be subjected to all of the stresses and strains to which the body of the film would otherwise be subjected, and which band, by virtue of its being of a relatively strong material, will permit of a film being employed in connection with uses in which it has heretofore been regarded as impracticable.

The arrangement of the mechanism in the present instance is such that the carrying-band will include side members and crossbars, to which latter the film body is affixed, the side members of the carrying-band being formed with sprocket openings and receiving virtually all of the wear and tear to which the unit is subjected. It will also be noted that the film body is of such width that it slightly overlaps the side members of the carrying-band, and thus, by means of the present invention, a unit may be provided which has extremely desirable characteristics.

While in the machine this unit, i. e., the composite strip, will not be subjected to any great amount of strain, it being of interest to note in this connection, and as has been best shown in Fig. 1, that the unit is fed from the sprocket 96 to a sprocket 100, which may be driven in any desirable manner and which serves to translate the intermittent feeding of the unit into continuous movement towards the reel 31.

From the foregoing it will be understood that, among others, the objects aforementioned have been accomplished, and it will be appreciated that the machine embodies novel functions which may be employed to advantage in numerous different applications, it being furthermore appreciated that since any number of structural variations may be resorted to without in the least departing from the scope thereof it is intended that all matter contained in the above description, or shown in the accompanying drawings, shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. A strip-forming and assembling machine, including, in combination, means for feeding a band of material, means for feeding a strip of material having a greater length than the length of said band, and means for uniting the ends of said strip and band in registry with each other whereby a surplusage of strip will be carried by said band.

2. A strip-forming and assembling machine, including, in combination, means for feeding a band of material, means for feeding a strip of material having a greater length than the length of said band, means for uniting the ends of said strip and band in registry with each other whereby a surplusage of strip will be carried by said band, and means for varying the disproportionate length of said strip and the consequent surplusage of the same.

3. A strip-forming and assembling machine, including, in combination, means for feeding a band of material, means for feeding a strip of material having a greater length than the length of said band, and means for securing said strip to said band at a number of different points in registry with each other whereby a surplusage of strip is carried by said band.

4. A strip-forming and assembling machine, including, in combination, means for forming a band with feed perforations, and sight apertures between said perforations to provide cross-bars between said apertures, means for forming strip-securing elements in association with said cross-bars, means for feeding a strip, and means for associating the same with the securing elements carried by said band and with the length of said strip greater between the points at which it is secured to said band than the distance between said elements.

5. A method of uniting strips of material, which includes operating upon one strip to form the same with a series of sight apertures together with tongues extending into said apertures, and in subsequently fastening a second strip to said first-named strip by means of said tongues.

6. A method of uniting strips of material, which includes operating upon one strip to form the same with a series of sight apertures, and in subsequently applying a second strip to said first-named strip and of a greater over-all length than said first strip, and in uniting said strips at a number of different points and with their end portions and such points of uniting in registry whereby to provide a surplusage on the part of one of said strips.

7. A strip-forming and assembling machine, including, in combination, means for forming a band with feed perforations, and sight apertures between said perforations to provide cross-bars between said apertures, means for forming strip-securing elements in association with said cross-bars, means for feeding a strip, means for associating the same with the securing elements carried by said band and with the length of said strip greater between the points at which it is secured to said band than the distance between said elements whereby to provide a strip surplusage, and means for varying the amount of such surplusage.

8. A strip-forming and assembling machine, including, in combination, means for forming sight apertures in a band, means for providing tongues extending into said apertures, means for bending said tongues to cause the same to extend at an angle to the body of said band, means for forming tongue-receiving openings in a strip, means for introducing the tongues into said openings, and means for bending said tongues to clamping position.

9. A strip-forming and assembling machine, including, in combination, means for forming perforations in a film, means for forming sight apertures in a band having a greater width than said film, means providing tongues extending adjacent said apertures, means for projecting said tongues through the perforations of said film, and means for subsequently bending said tongues to lock said film to said band.

10. A device of the character described, including, in combination, means for feeding a carrying-band, conducting means for an unperforated film having a width less than said carrying band, and means for causing said carrying-band to extend over the entire face of, and to be united with, said film.

11. A device of the character described, including, in combination, means for moving a carrying-band, means for guiding the movements of a marginally unperforated film of less width than said carrying-band, and means for causing said carrying-band to be united with, and extend across and beyond, the film.

12. A device of the character described, including, in combination, means for moving a strip, means for guiding the movements of a second marginally unperforated strip of less width than said first-named strip, and means for uniting and causing said first-named strip to extend across said last-named strip, the outer edges of said first-named strip extending beyond the outer edges of said last-named strip.

13. A device of the character described, including, in combination, means for feeding a metal strip, means for conducting a film to a position adjacent thereto, means for forming a series of light apertures in said strip, and means for attaching said film to said strip.

14. A device of the character described including, in combination, means for feeding a metal strip, means for conducting a film to a position adjacent thereto, means for forming a series of light apertures in said strip and with tongues extending from one of the edge portions of each of said apertures, and means for causing said tongues to engage said film to permanently unite the latter with said strip.

15. A device of the character described including, in combination, means for feeding a metal strip, means for conducting a film to a position adjacent thereto, means for forming series of feed perforations and light apertures in said strip, and means for attaching said film to said strip and in registry with said apertures.

16. A device of the character described including, in combination, means for feeding a metal strip, means for conducting a film to a position adjacent thereto, means for forming series of light apertures and feed perforations in said strip and with tongues extending from the edges of said apertures, and means for causing said tongues to engage said film to permanently unite the same with said strip.

17. A device of the character described including, in combination, means for feeding a metal strip, means for conducting a film to a position adjacent thereto, means for forming said strip with series of openings, one series constituting feed perforations and another series providing light apertures, said latter means providing film retaining members extending from the edges of certain of said openings, and means for causing said retaining members to engage said film to permanently unite the same with said strip.

18. A device of the character described including, in combination, means for feeding a metal strip, means for conducting a film to a position adjacent thereto, means for forming a series of light apertures in said strip and said apertures being defined by cross bars and tongues extending from the edges of said bars, and means for causing said tongues to engage said film to permanently unite the latter with said strip and in registry with said light apertures.

19. A device of the character described including, in combination, means for feeding a single metal strip, means for guiding a film adjacent thereto, and said film being of a width less than the width of said strip, means for forming said strip with film engaging portions, and means for bringing said portions into permanent contact with said film.

20. A device of the character described including, in combination, means for feeding a metal strip, means for conducting a film to a position adjacent thereto, means for forming series of feed perforations in said strip and one adjacent each of the side edges thereof, means for forming light apertures in said strip with tongues extending from the edge portions of said apertures, said apertures being arranged between said series of perforations, and means for causing said tongues to extend in permanent contact with said film to retain the latter in registry with said apertures.

21. A device of the character described including, in combination, means for forming series of feed perforations in a metal strip, means for forming light apertures therein with tongues extending from the edge portions of said apertures and said apertures being arranged between said series of perforations, means for intermittently moving said metal strip with respect to said forming means, means for retaining said strip against movement during its periods of rest, and means for bringing said tongues into permanent contact with said film with the latter in registry with said light apertures.

22. A device of the character described including, in combination, means for feeding a metal strip, means for conducting a film to a position adjacent thereto, means for uniting said film and strip at a plurality of points with a surplusage of film between said points, and means for varying the amount of such surplusage.

23. A device of the character described including, in combination, means for feeding a metal strip, means for conducting a film to a position adjacent thereto, means for forming series of feed perforations in said strip and adjacent the side edges thereof, means for forming light apertures in said strip and between said series of perforations, said latter means including means for forming tongues extending from the edges of said apertures, means for causing said tongues to extend at an angle to the strip body, means for forming openings in said film, means for causing said tongues to enter said openings, and means for bending said tongues into clamping contact to retain said film in permanent association with said strip between said series of feed perforations and in registry with said apertures.

24. A device of the character described including, in combination, means for feeding a metal strip, means for conducting a film to a position adjacent thereto, means for forming series of feed perforations in said strip and adjacent the side edges thereof, means for forming light apertures in said strip and between said series of perforations, said latter means including means for forming tongues extending from the edges of said apertures, means for causing said tongues to extend at an angle to the strip body, means for forming openings in said film, means for causing said tongues to enter said openings, means for bending said tongues into clamping contact to retain said film in permanent association with said strip between said series of feed perforations and in registry with said apertures, the distance between the openings in said film being greater than the distance between the tongues to be extended therethrough, and means for varying the distance between said openings.

In testimony whereof I affix my signature.

ARTHUR PRICE.